United States Patent
Meverden et al.

(10) Patent No.: US 6,693,155 B1
(45) Date of Patent: Feb. 17, 2004

(54) PROPYLENE POLYMERIZATION PROCESS

(75) Inventors: Craig C. Meverden, Mason, OH (US); Gregory G. Hlatky, Morrow, OH (US); Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/379,752

(22) Filed: Mar. 5, 2003

(51) Int. Cl.[7] .............................. C08F 4/64; C08F 10/06
(52) U.S. Cl. ..................... 526/160; 526/126; 526/127; 526/129; 526/134; 526/161; 526/170; 526/348.2; 526/348.5; 526/351; 526/943
(58) Field of Search ................. 526/126, 127, 526/129, 134, 160, 161, 170, 348.2, 348.5, 351, 943

(56) References Cited

U.S. PATENT DOCUMENTS

| | | | |
|---|---|---|---|
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,495,035 A | 2/1996 | Jordan et al. | 556/1 |
| 5,539,124 A * | 7/1996 | Etherton et al. | 548/402 |
| 5,648,440 A | 7/1997 | Sugano et al. | 526/132 |
| 6,191,294 B1 * | 2/2001 | Resconi et al. | 556/11 |
| 6,211,311 B1 | 4/2001 | Wang et al. | 526/131 |
| 6,232,260 B1 | 5/2001 | Nagy et al. | 502/155 |
| 6,559,251 B1 | 5/2003 | Wang et al. | 526/127 |

FOREIGN PATENT DOCUMENTS

| | | |
|---|---|---|
| WO | WO 99/24446 | 5/1999 |
| WO | WO 01/53360 | 7/2001 |

OTHER PUBLICATIONS

Buu–Hoi and Xuong, *J. Chem. Soc.* (1952) 2225.
G. Diamond, et al., *J. Am. Chem. Soc. 118*(1996) 8024.
G. Diamond, et al., *Organometallics 15*(1996) 4045.
A. Zambelli, et al., *Macromolecules 8*(1975) 687.
A. Zambelli, et al., *Macromolecules 6*(1973) 925.
G. Odian, *Principles of Polymerization*, 2nd Edition, (1981) 568–580.

* cited by examiner

*Primary Examiner*—Fred Teskin
(74) *Attorney, Agent, or Firm*—John Tyrell; Jonathan L. Schuchardt

(57) ABSTRACT

A process for polymerizing propylene is disclosed. The propylene is polymerized with a catalyst system which comprises an activator and a [1,2-b]indenoindolyl Group 4–6 transition metal complex having open architecture. The process has high catalyst activity and gives high molecular weight elastomeric polypropylene.

13 Claims, No Drawings

PROPYLENE POLYMERIZATION PROCESS

FIELD OF THE INVENTION

This invention relates to a process for polymerizing propylene in the presence of a catalyst system which comprises an activator and a [1,2-b]indenoindolyl Group, 4–6 transition metal complex having open architecture.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Single-site olefin polymerization catalysts having "open architecture" are generally known. Examples include the so-called "constrained geometry" catalysts developed by scientists at Dow Chemical Company (see, e.g., U.S. Pat. No. 5,064,802), which have been used to produce a variety of polyolefins. "Open architecture" catalysts differ structurally from ordinary bridged metallocenes, which have a bridged pair of pi-electron donors. In open architecture catalysts, only one group of the bridged ligand donates pi electrons to the metal; the other group is sigma bonded to the metal. An advantage of this type of bridging is thought to be a more open or exposed locus for olefin complexation and chain propagation when the complex becomes catalytically active. Simple examples of complexes with open architecture are tert-butylamido(cyclopentadienyl)dimethylsilyl-zirconium dichloride and methylamido(cyclopentadienyl)-1,2-ethanediyl-titanium dimethyl:

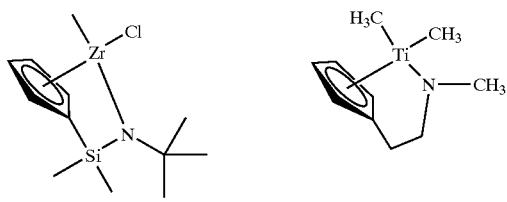

Organometallic complexes that incorporate "indenoindolyl" ligands are known (see U.S. Pat. No. 6,232,260 and PCT Int. Appl. WO 99/24446 ("Nifant'ev")). The '260 patent demonstrates the use of non-bridged bis (indenoindolyl) complexes for making HDPE in a slurry polymerization. Versatility is an advantage of the complexes; by modifying the starting materials, a wide variety of indenoindolyl complexes can be prepared. "Open architecture" complexes are neither prepared nor specifically discussed. Nifant'ev teaches the use of bridged indenoindolyl complexes as catalysts for making polyolefins, including polypropylene, HDPE and LLDPE. The complexes disclosed by Nifant'ev do not have open architecture.

PCT Int. Appl. WO 01/53360 (Resconi et al.) discloses bridged [2,1-b]indenoindolyl complexes having open architecture and their use to produce substantially amorphous propylene-based polymers. Resconi teaches many open architecture complexes but none of them is a [1,2-b] indenoindolyl complex.

Pending Appl. Ser. No. 10/211,085 filed Aug. 2, 2002, now allowed, discloses a process for copolymerizing ethylene with at least one alpha-olefin selected from the group consisting of 1-butene, 1-hexene, and 1-octene in the presence of a catalyst system which comprises an activator and a silica-supported, indenoindolyl Group 4–6 transition metal complex having open architecture to produce an ethylene copolymer having a density less than about 0.910 g/cm$^3$. While both [1,2-b] and [2,1-b]indenoindolyl complexes are disclosed, no comparative results between the two configurations are given nor is there any indication of improved activity. The advantage of using the open architecture complexes is stated to be the ability to incorporate comonomers in ethylene polymerizations to form low density polyethylene. Propylene is not disclosed as a monomer or as a comonomer.

Despite the considerable work done in this area, there is much that is not understood. There is a continued need for improved catalysts for propylene polymerizations. One need is improved activity. Improved activity lowers the cost of catalyst per kg of polymer produced. Also, since the catalyst is not removed from the polymer, improved activity lowers the amount of residual transition metal left in the polymer. High levels of residual transition metal can have deleterious effects such as poor aging properties or poor color retention. There is a continued need for high molecular weight elastomeric polypropylene for a variety of applications that require toughness, flexibility and elastic properties.

SUMMARY OF THE INVENTION

The invention is a process for the polymerization of propylene. The polymerization is done in the presence of a catalyst system which comprises an activator and a [1,2-b] indenoindolyl Group 4–6 transition metal complex having open architecture. Surprisingly, the [1,2-b]indenoindolyl complex is much more active than its counterpart [2,1-b] indenoindolyl complex in propylene polymerizations.

DETAILED DESCRIPTION OF THE INVENTION

Catalyst systems useful for the process comprise an activator and a [1,2-b]indenoindolyl Group 4–6 transition metal complex having open architecture. More preferred complexes include a Group 4 transition metal such as titanium or zirconium.

"Indenoindolyl" ligands are generated by deprotonating an indenoindole compound using a potent base. By "indenoindole compound," we mean an organic compound that has both indole and indene rings. The five-membered rings from each are fused, i.e., they share two carbon atoms. The rings are fused such that the indole nitrogen and the only sp$^3$-hybridized carbon on the indenyl ring are "trans" to each other. Such is the case in an indeno[1,2-b] ring system such as:

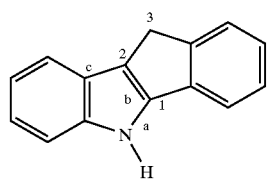

The [2,1-b] complexes are excluded. For examples of [2,1-b] complexes, see PCT Int. Appl. WO 01/53360 (Resconi et al.).

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydro-indeno[1,2-b]indole is numbered as follows:

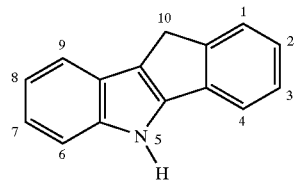

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

[1,2-b]Indenoindolyl complexes useful for the process of the invention have open architecture. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indenyl methylene carbon. (In contrast, many of the bridged indenoindolyl complexes described in the literature have a transition metal that is pi-bonded to the indenyl Cp ring and pi-bonded to another Cp-like group. See, e.g., U.S. Pat. No. 6,232,260 or WO 99/24446).

Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to the indenyl methylene carbon.

In addition to the bridged [1,2-b]indenoindolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

In a preferred process of the invention, the [1,2-b] indenoindolyl complex has the general structure:

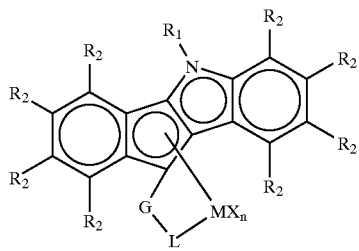

in which $R_1$ is selected from the group consisting of $C_1$–$C_{30}$ hydrocarbyl, $C_1$–$C_6$ halocarbyl, $C_1$–$C_{30}$ halohydrocarbyl and trialkylsilyl; each $R_2$ is independently selected from the group consisting of $R_1$, H, F, Cl, Br and $C_1$–$C_6$ alkoxy; G is a divalent radical selected from the group consisting of hydrocarbyl and heteroatom containing alkylene radicals, diorgano silyl radicals, diorgano germanium radicals and diorgano tin radicals; L is a ligand that is covalently bonded to G and M; M is a Group 4 to 6 transition metal; each X is independently selected from the group consisting of halide, alkoxy, siloxy, alkylamino, and $C_1$–$C_{30}$ hydrocarbyl and n satisfies the valence of M. More preferably, M is a Group 4 transition metal, L is alkylamido, G is dialkysilyl, and X is halide or alkyl.

Exemplary organometallic complexes useful for the process of the invention:

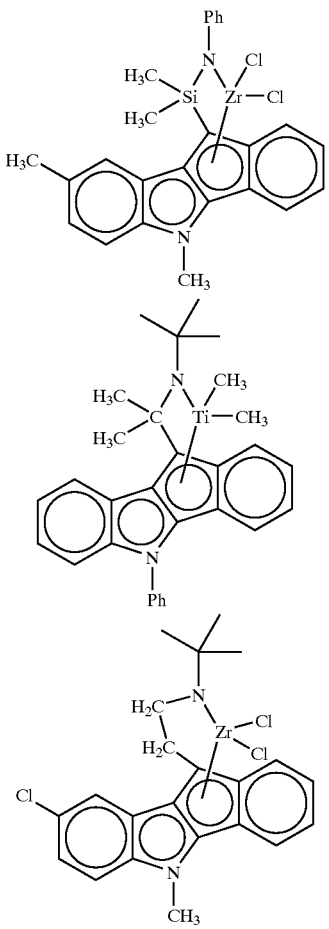

The complexes can be made by any suitable method; those skilled in the art will recognize a variety of acceptable synthetic strategies. The [1,2-b]indenoindolyl complexes can be made from the 1-indanone precursors in similar fashion as their counterpart [2,1-b]indenoindolyl complexes are made from the 2-indanone precursors. For synthesis of [2,1-b]indenoindolyl complexes, see especially PCT Int. Appl. WO 01/53360 for suitable routes. Often, the synthesis; begins with preparation of the desired [1,2-b]indenoindole compound from particular 1-indanone and arylhydrazine precursors. In one convenient approach, the indenoindole is deprotonated and reacted with dichlorodimethylsilane to attach a chlorodimethylsilyl group to the indenyl methylene carbon. Subsequent reaction with an amine or, more preferably, an alkali metal amide compound such as lithium tert-butylamide (from tert-butylamine and n-butyllithium), displaces chloride and gives the desired silylamine product. Double deprotonation and reaction with a transition metal source gives the target indenoindolyl metal complex having open architecture. A typical reaction sequence follows:

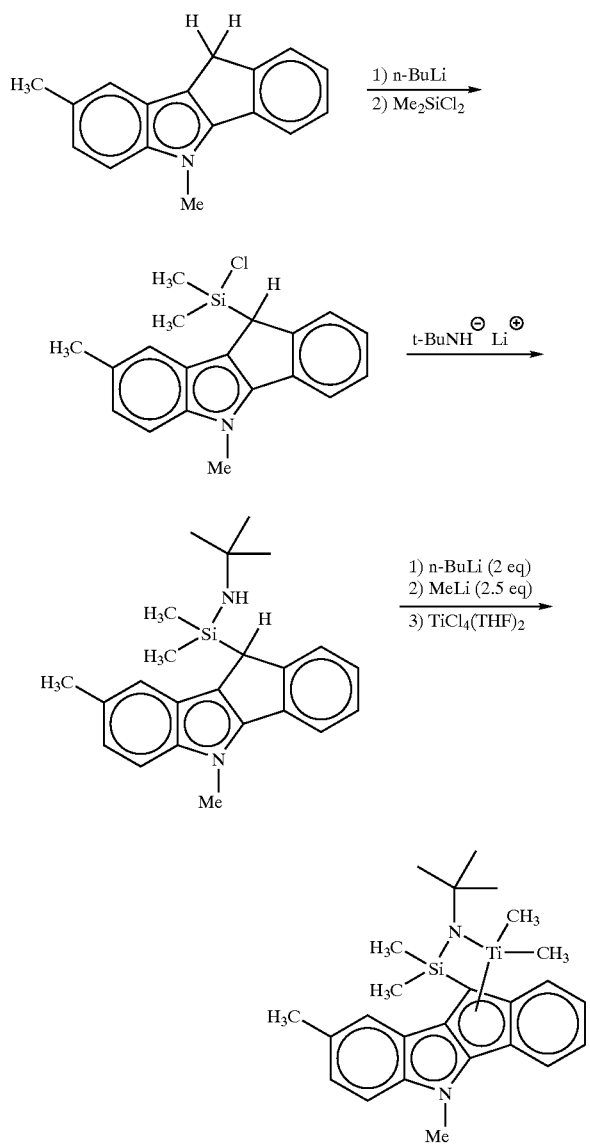

A similar complex can be generated by amine elimination, which may or may not require heating, with a method explored by Professor Richard F. Jordan and coworkers at the University of Iowa:

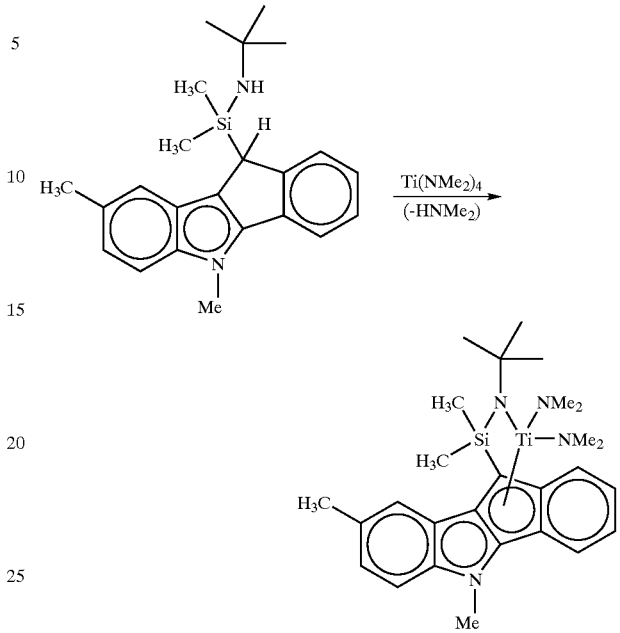

For additional examples of this approach to making organometallic complexes, see U.S. Pat. No. 5,495,035; *J. Am. Chem. Soc.* 118 (1996) 8024; and *Organometallics* 15 (1996) 4045.

Similar strategies can be used to make a wide variety of [1,2-b]indenoindolyl metal complexes having open architecture.

Any convenient source of the transition metal can be used to make the complex. As shown above, the transition metal source conveniently has labile ligands such as halide or dialkylamino groups that can be easily replaced by the indenoindolyl and amido anions of the bridged indenoindolyl ligand. Examples are halides (e.g., $TiCl_4$, $ZrCl_4$), alkoxides, amides, and the like.

Catalyst systems useful in the process include, in addition to the indenoindolyl metal complex, an activator. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis(penta-fluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157, 5,198,401, and 5,241, 025, the teachings of which are incorporated herein by reference. Suitable activators also include aluminoboronates—reaction products of alkyl aluminum compounds and organoboronic acids—as described in U.S.

Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction: conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

Optionally, the complex is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably, greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

Many types of polymerization processes can be used. The process can be practiced in the gas phase, bulk, solution, or slurry. The polymerization can be performed over a wide temperature range. Generally, lower temperatures give higher molecular weight and longer catalyst lifetimes. However, since the polymerization is exothermic, lower temperatures are more difficult and costly to achieve. A balance must be struck between these two factors. Preferably, the temperature is within the range of about 0° C. to about 150° C. A more preferred range is from about 20° C. to about 90° C.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

Polypropylene prepared by this process is elastomeric. One indication that the polypropylene is elastomeric is the tacticity of the polypropylene prepared by the process. The tacticity of a polymer affects its properties. The term "tacticity" refers to the stereochemical configuration of the polymer. For example, adjacent monomer units can have either like or opposite configuration. If all monomer units have like configuration, the polymer is "isotactic." If adjacent monomer units have opposite configuration and this alternating configuration continues along the entire polymer chain, the polymer is "syndiotactic." If the configuration of monomer units is random, the polymer is "atactic." When two contiguous monomer units, a "diad," have the same configuration, the diad is called isotactic or "meso" (m). When the monomer units have opposite configuration, the diad is called "racemic" (r). For three adjacent monomer units, a "triad," there are three possibilities. If the three adjacent monomer units have the same configuration, the triad is designated mm. An rr triad has the middle monomer unit having an opposite configuration from either neighbor. If two adjacent monomer units have the same configuration and it is different from the third monomer, the triad is designated as having mr tacticity. The configuration can be determined by $^{13}$C nuclear magnetic resonance spectroscopy as described in *Macromolecules* 8 687 (1975) and in *Macromolecules* 6 925 (1973) and references cited therein. For more information on polymer stereochemistry, see G. Odian, *Principles of Polymerization*, $2^{nd}$ edition, pages 568–580 (1981).

The configuration of the monomer units affects the polymer properties. The polypropylene made by the process of the invention is characterized in that it is neither highly isotactic nor highly syndiotactic. This tacticity is an indication of elastomeric properties.

The polypropylene has high molecular weight and low polydispersity. The $M_w$ and polydispersity ($M_w/M_n$) can be measured by gel permeation chromatography and affect polymer properties such as elasticity. Generally, the elastic properties such as tensile set and stress recovery improve with increasing molecular weight. The $M_w$ is typically greater than 100,000, preferably between 200,000 and 1,500,000 and more preferably between 300,000 and 1,200,000. The polydispersity is typically below 5.0, preferably between 2 and 4 and most preferably between 2.5 and 3.5.

The following examples merely illustrate the invention. Those skilled in the art will recognize many variations that are within the spirit of the invention and scope of the claims.

EXAMPLE 1

Open Architecture [1,2-b]Indenoindolyl Complex 4

(a) Preparation of Indeno[1,2-b]indole 1. A mixture of 1-indanone (30.6 g, 232 mmol) and p-tolylhydrazine hydrochloride (37.0 g, 233 mmol) in ethanol (350 mL) and aqueous HCkl (12 N, 18 mL) are heated to reflux for 90 min. The mixture is cooled and filtered, and the solid is washed with ethanol (600 mL) followed by 20% aqueous ethanol (400 mL) and finally hexanes (200 mL). The off-white solid is dried under vacuum (36.5 g, 72%).

(b) N-Methylation of 1. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of methyl iodide (17.0 mL, 273 mmol) in toluene (15 mL) is added dropwise, and the mixture is stirred at room temperature for 4 h and refluxed for 3 h. A crystalline solid forms, upon cooling and is filtered and washed with cold (−78° C.) ethanol (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Bridged liqand preparation (3). n-Butyllithium (8 mL, 2.5 M in hexane, 20 mmol) is added dropwise to a solution of 2 (4.66 g, 21 mmol) in dry ether (70 mL). After 2 h, this solution is slowly added to a solution of dichlorodimethylsilane (5.20 g) in ether (30 mL). After 2 h of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 h, and is then filtered through Celite filter aid. After concentrating the filtrate, the residue is collected with pentane and chilled to −30° C. Yield of bridged ligand 3: 6 g (82%).

(d) Preparation of open architecture [1,2-b]indenoindolyl complex 4.

Bridged ligand 3 (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 h. The mixture is filtered and the filtrate is concentrated. The residue is extracted with hot heptane (2×100 mL). The combined filtrates are evaporated, and the residue is crystallized with pentane and cooled to −30° C. The product, complex 4, is a dark brown solid. Yield: 4.67 g. The $^1$H NMR spectrum is consistent with the proposed structure

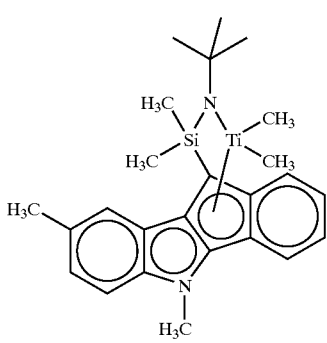

4

EXAMPLE 2

Open Architecture [1,2-b]Indenoindolyl Complex 5

The synthesis of Example 1 was generally followed except that lithium 1,1,3,3-tetramethylbutylamide was used in place of lithium t-butylamide to yield open architecture [1,2-b]indenoindolyl complex 5.

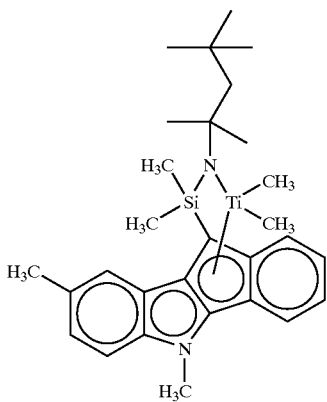

5

COMPARATIVE EXAMPLE 3

Open Architecture [2,1-b]Indenoindolyl Complex 6

This compound was prepared from 2-indanone substantially according to the procedure detailed in PCT Int. Appl. WO 01/53360 Example 1 to yield open architecture [2,1-b]indenoindolyl complex 6.

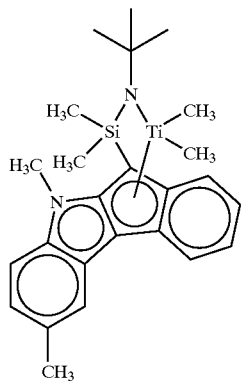

6

EXAMPLE 4

Propylene Polymerization

A solution of complex and activator was prepared in an inert atmosphere dry box by mixing 5 mg of open architecture [1,2-b]indenoindolyl complex 4 from Example 1 with 3.5 mL of MAO (10% by weight solution of methylalumoxane in toluene) and 16.5 mL of toluene. This solution was allowed to age for 30 minutes before adding to the polymerization reactor.

To a 1 L stainless-steel stirred reactor, at room temperature, was charged 400 mL of dry, oxygen-free propylene. Then 1.6 mL of a 25% by weight solution of triisobutylaluminum in heptane was flushed into the reactor with 50 mL of isobutane. The reactor was brought to 50° C. and allowed to equilibrate. Polymerization was then begun by adding 1.0 mL of the solution of complex and activator and by flushing with 50 mL of isobutane. After 60 minutes of polymerization at 50° C., the reactor was vented to remove the remaining propylene and isobutane. The polymer was removed from the reactor, soaked overnight in 1 L of methanol, filtered, and dried. The activity was calculated to be 2467 kg polypropylene per g titanium metal per hour. The weight average molecular weight and polydispersity were determined by GPC. $M_w$=736,000; $M_w/M_n$=3.5. The polymer tacticity was measured by $^{13}$C NMR and found to be 7% mm triads (isotactic triads) and 59% rr triads (syndiotactic triads) showing that that the polypropylene is neither highly isotactic nor highly syndiotactic which is an indication that the polypropylene has elastomeric properties.

EXAMPLE 5

The polymerization of Example 4 was repeated to obtain polypropylene with weight average molecular weight of 683,000. The polypropylene was molded into ASTM type I tensile bars and the properties measured. The tensile strength at break was 4.86 MPa and the elongation at break was 550%. The tensile set at 200% was measured by extending the sample to 200% of the original length and holding the sample for ten minutes, followed by releasing the sample and then measuring the set after another ten minutes. A set of 0% indicates complete return to the original length while 100% would indicate no return from the elongated position. The tensile set was 8%. The stress recovery was 31%. This is the decrease in sample stress at 200% elongation after ten minutes.

These tensile properties demonstrate the good elastomeric properties of the polypropylene prepared by the process of the invention.

EXAMPLES 6 AND 7 AND COMPARATIVE EXAMPLES 8 AND 9

Propylene Polymerizations

The polymerization procedure of Example 4 was generally followed with different complexes and polymerization temperatures. The conditions and results are listed in Table 1.

TABLE 1

Propylene Polymerizations

| Example | Complex | Polym. Temp. °C. | Activity | $M_w/1000$ | $M_w/M_n$ | mm | rr |
|---|---|---|---|---|---|---|---|
| 4 | 4 | 50 | 2467 | 736 | 3.5 | 0.07 | 0.59 |
| 6 | 4 | 70 | 2156 | 582 | 3.0 | 0.11 | 0.49 |
| 7 | 5 | 50 | 3392 | 944 | 2.9 | 0.13 | 0.46 |
| C8 | 6 | 50 | 300 | 1090 | 3.5 | 0.08 | 0.67 |
| C9 | 6 | 70 | 197 | 810 | 3.2 | 0.09 | 0.62 |

Examples 4, 6 and 7 show that polymerizations performed with unsupported, open architecture, [1,2-b]indenoindolyl complexes give about a tenfold improvement in activity versus the polymerizations in Comparative Examples 8 and 9 performed with unsupported, open architecture, [2,1-b] indenoindolyl complexes. The polypropylene prepared by the process of the invention has high molecular weight and low polydispersity. The tacticity data shows that the polymers are neither highly isotactic nor highly syndiotactic. This level of tacticity is indicative of elastomeric polypropylene.

Preparation of Silica-supported Complexes 4 and 6

Grace Davison 955 silica is calcined at 250° C. for 12 h. In a glove-box under nitrogen, a 30 wt. % solution of methylalumoxane (MAO) in toluene (0.8 mL) is slowly added to a sample (1.0 g) of the calcined silica at room temperature with efficient stirring. After the MAO addition is complete, stirring continues for 0.5 h. Volatiles are removed under vacuum (about 28.5 inches Hg, 1 hour) at room temperature. Yield: 1.30 g of MAO-treated silica.

Also in the glovebox, 30 wt. % MAO/toluene solution (1.18 mL) is diluted with toluene (3.4 mL), and an amount of open architecture titanium complex (4 or 6) equal to 0.048 mmol of titanium is then added to the diluted MAO to form a solution. This resulting solution is then mixed with the dry, MAO-treated silica described above. After stirring for an additional 0.5 h, the supported complex is dried under vacuum to give a supported complex (about 1.80 g).

EXAMPLE 10

Polymerization of Propylene Using Supported Complex 4

To a 1-L, stainless-steel stirred reactor, at room temperature, 1.0 mL of 1.0M of triisobutylaluminum in heptane is flushed into the reactor with 450 mL of dry, oxygen-free propylene. The reactor is brought to 70° C. and allowed to equilibrate. Polymerization begins upon adding supported complex 4 (98 mg) by flushing with 50 mL of dry, oxygen-free propylene. After 30 minutes of polymerization at 70° C., the reactor is vented to remove the remaining propylene. The polymer is removed from the reactor and dried. Activity: 331 kg polypropylene per g titanium per hour.

COMPARATIVE EXAMPLE 11

Propylene Polymerization Using Supported Complex 6

Example 10 is repeated, except that supported complex 6 is used. Activity: 79 kg polypropylene per g titanium per hour.

Example 10 and Comparative Example 11 demonstrate the advantage of selecting a supported, open architecture, [1,2-b]indenoindolyl complex for making polypropylene.

The preceding examples are meant only as illustrations. The following claims define the invention.

We claim:

1. A process which comprises polymerizing propylene in the presence of a catalyst system which comprises an activator and a [1,2-b]indenoindolyl, Group 4–6 transition metal complex having open architecture.

2. The process of claim 1 wherein the complex is a Group 4 transition metal complex.

3. The process of claim 1 wherein the activator is selected from the group consisting of alumoxanes, alkylaluminum compounds, organoboranes, ionic borates, ionic aluminates, aluminoboronates and mixtures thereof.

4. The process of claim 1 wherein propylene is copolymerized with at least one olefin.

5. The process of claim 4 wherein the olefin is selected from the group consisting of ethylene, propylene, 1-hexene and 1-octene.

6. The process of claim 1 wherein the [1,2-b] indenoindolyl Group 4–6 transition metal complex has the structure:

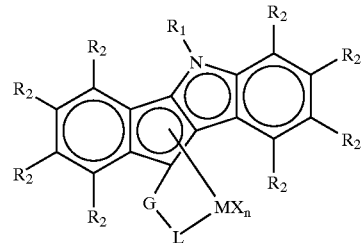

in which $R_1$ is selected from the group consisting of $C_1$–$C_{30}$ hydrocarbyl, $C_1$–$C_6$ halocarbyl, $C_1$–$C_{30}$ halohydrocarbyl and trialkylsilyl; each $R_2$ is independently selected from the group consisting of $R_1$, H, F, Cl, Br and $C_1$–$C_6$ alkoxy; G is a divalent radical selected from the group consisting of hydrocarbyl and heteroatom containing alkylene radicals, diorgano silyl radicals, diorgano germanium radicals and diorgano tin radicals; L is a ligand that is covalently bonded to G and M; M is a Group 4 to 6 transition metal; each X is independently selected from the group consisting of halide, alkoxy, siloxy, alkylamino, and $C_1$–$C_{30}$ hydrocarbyl and n satisfies the valence of M.

7. The process of claim 6 wherein M is a Group 4 transition metal, L is alkylamido and G is dialkylsilyl.

8. The process of claim 7 wherein M is Ti or Zr, L is t-butylamido, G is dimethylsilyl and X is halide or alkyl.

9. The process of claim 1 wherein the polymerization is performed at a temperature within the range of about 20° C. to about 90° C.

10. The process of claim 1 wherein the complex is supported on silica.

11. A slurry polymerization process of claim 1.

12. A gas-phase polymerization process of claim 1.

13. A solution polymerization process of claim 1.

* * * * *